(12) United States Patent
Mills et al.

(10) Patent No.: US 11,762,441 B2
(45) Date of Patent: Sep. 19, 2023

(54) METHODS AND APPARATUS TO REDUCE INRUSH CURRENT IN UNIVERSAL SERIAL BUS CIRCUITS AND SYSTEMS

(71) Applicant: Texas Instruments Incorporated, Dallas, TX (US)

(72) Inventors: Michael J. Mills, Plano, TX (US); Gregory A. Watkins, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 244 days.

(21) Appl. No.: 16/263,668

(22) Filed: Jan. 31, 2019

(65) Prior Publication Data
US 2020/0249742 A1 Aug. 6, 2020

(51) Int. Cl.
*G06F 1/26* (2006.01)
*H02H 3/08* (2006.01)

(52) U.S. Cl.
CPC ............... *G06F 1/266* (2013.01); *H02H 3/08* (2013.01); *G06F 2213/0042* (2013.01)

(58) Field of Classification Search
CPC .................................................... G06F 1/3215
See application file for complete search history.

(56) References Cited

U.S. PATENT DOCUMENTS

| | | | | |
|---|---|---|---|---|
| 8,949,631 B2 * | 2/2015 | Chen | ....................... | G06F 1/266 710/10 |
| 10,108,243 B1 * | 10/2018 | Chen | ..................... | G06F 1/3215 |
| 2005/0017766 A1 * | 1/2005 | Formenti | .............. | H02J 7/0068 327/110 |
| 2007/0262651 A1 * | 11/2007 | Odaohara | ............... | H02J 9/061 307/66 |
| 2010/0202161 A1 * | 8/2010 | Sims | ....................... | H02M 7/02 363/20 |
| 2011/0068626 A1 * | 3/2011 | Terlizzi | ..................... | H02J 1/14 307/32 |
| 2011/0156483 A1 * | 6/2011 | Caraghiorghiopol | ....................... | H02J 7/0068 307/66 |
| 2014/0139187 A1 * | 5/2014 | Peng | ................... | H02J 7/00718 320/134 |
| 2014/0176105 A1 * | 6/2014 | Yamaguchi | ............. | H02M 1/08 323/284 |
| 2015/0357864 A1 * | 12/2015 | Gofman | ........... | H03K 19/00369 307/64 |
| 2016/0056588 A1 * | 2/2016 | Motoichi | ........... | H01R 13/7137 439/620.22 |

(Continued)

*Primary Examiner* — Gustavo A Rosario-Benitez
(74) *Attorney, Agent, or Firm* — Ray A. King; Frank D. Cimino

(57) ABSTRACT

Methods, apparatus, systems and articles of manufacture are disclosed including a capacitor, located in a universal serial bus schematic. The methods, apparatus, systems and articles of manufacture include a controller, include a controller including a state machine and a control signal generator, wherein the controller is configured to be coupled to a connector and to a power supply, the state machine is configured to determine a state of the connector, and the control signal generator is configured to, in response to an indication of a device not connected to the connector, generate a signal to indicate to the power supply to charge a capacitor to a threshold voltage, and wherein the control signal generator is further configured to generate the signal until a second state.

19 Claims, 4 Drawing Sheets

(56) References Cited

U.S. PATENT DOCUMENTS

| | | | |
|---|---|---|---|
| 2016/0116928 A1* | 4/2016 | Motoki | G05F 1/575 |
| | | | 323/280 |
| 2016/0118880 A1* | 4/2016 | Motoki | H02M 3/33523 |
| | | | 323/282 |
| 2016/0352232 A1* | 12/2016 | Chang | H02M 3/33523 |
| 2017/0047852 A1* | 2/2017 | Huang | H02J 7/00 |
| 2018/0198368 A1* | 7/2018 | Shaik | H02M 3/158 |
| 2018/0219399 A1* | 8/2018 | Balakrishnan | H02J 7/007184 |
| 2019/0229635 A1* | 7/2019 | Hyugaji | H02M 1/32 |
| 2019/0288532 A1* | 9/2019 | Mattos | H02J 7/00308 |
| 2019/0391628 A1* | 12/2019 | Camiolo | H02J 7/00 |
| 2020/0119540 A1* | 4/2020 | Buhari | H03K 17/08122 |
| 2020/0144915 A1* | 5/2020 | Mei | H02M 3/158 |
| 2021/0367439 A1* | 11/2021 | Liu | H02J 7/0063 |

* cited by examiner

US 11,762,441 B2

METHODS AND APPARATUS TO REDUCE INRUSH CURRENT IN UNIVERSAL SERIAL BUS CIRCUITS AND SYSTEMS

FIELD OF THE DISCLOSURE

This disclosure relates generally to Universal Serial Bus systems, and, more particularly, to methods and apparatus to reduce inrush current in Universal Serial Bus circuits and systems.

BACKGROUND

Universal Serial Bus (USB) systems include Universal Serial Bus Type-A (USB-A) and Universal Serial Bus Type-C (USB-C), each of which has a standard connector. USB-C compatible systems and devices (e.g., personal computers, docks, monitors) include a female and/or male connector structured differently than a USB-A female and/or male connector. The female and/or male connectors in USB-C compatible systems and devices are structured to be utilized by different electrical connection protocols than female and/or male connectors in USB-A compatible systems.

SUMMARY

The methods, apparatus, systems and articles of manufacture include a controller including a state machine and a control signal generator, wherein the controller is configured to be coupled to a connector and to a power supply, the state machine is configured to determine a state of the connector, and the control signal generator is configured to, in response to an indication of a device not connected to the connector, generate a signal to indicate to the power supply to charge a capacitor to a threshold voltage, and wherein the control signal generator is further configured to generate the signal until a second state.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
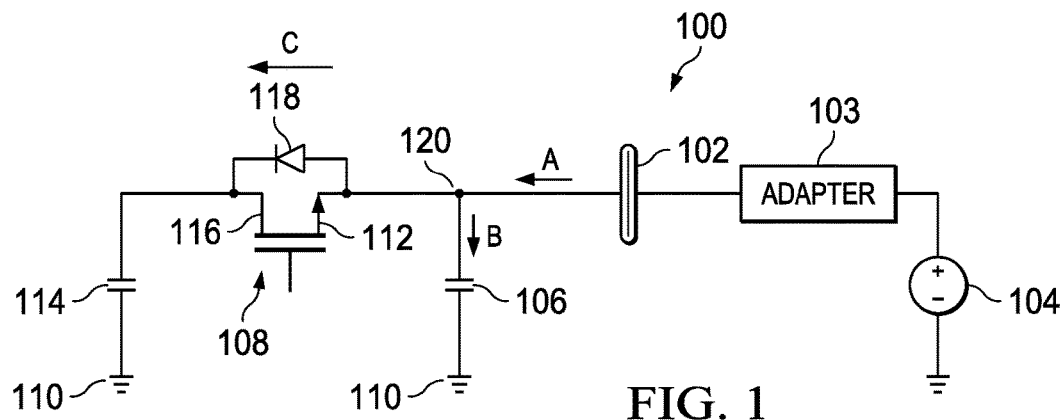
FIG. 1 is a schematic illustrating a USB-C system including a USB-C female connector coupled to a USB-A device through an adapter.

Universal Serial Bus (USB) is a common interface established for cables, connectors, protocols for connection, communication, and power supply. The USB standard includes several standard connectors (e.g., male and female connectors) such as Universal Serial Bus Type-A (USB-A) and Universal Serial Bus Type-C (USB-C).

The USB-A standard allows for a male connector to plug into a host device (e.g., desktop computer, laptop, dock). According to the USB-A standard, the host device (e.g., desktop computer, laptop, dock, dock) is a device to which USB-A compatible devices can connect. The USB-A compatible devices may supply power (e.g., a USB-A source) or consume power (e.g., a USB-A sink device). Generally, the USB-A standard supports the technical specifications such as Universal Serial Bus 1.0 (USB 1.0), Universal Serial Bus 1.1 (USB 1.1), Universal Serial Bus 2.0 (USB 2.0), Universal Serial Bus 3.0 (USB 3.0). The specifications supported by USB-A (e.g., USB 1.0, USB 1.1, USB 2.0, and USB 3.0) describe varying data and/or power transfer limits. Electrical specifications and standards supported by the USB-A standard (e.g., USB-A female and/or male connectors) include a main voltage bus ($V_{BUS\_A}$) in the female connector. The main voltage bus ($V_{BUS\_A}$) may also be included on the male connector. For a USB-A source, the main voltage bus ($V_{BUS\_A}$) includes a voltage potential of five volts. An electrical standard supported by the USB-A standard (e.g., USB-A connectors) includes a voltage potential across $V_{BUS\_A}$ while a USB-A source (e.g., computer, laptop, dock) is plugged in.

The USB-C standard allows host devices (e.g., desktops, computers, laptops, docks) to act as a host or a peripheral device. Moreover, a USB-C compatible device may supply power (e.g., a USB-C source), consume power (e.g., a USB-C sink), or supply and/or consume power (e.g., a USB-C Dual Role Power (DRP) device). Example USB-C DRP devices include docks, monitors, personal computers, cellular phones, or any other device capable of consuming and supplying power. The USB-C standard includes full duplex (e.g., ability simultaneously communicate host-to-device or device-to-host) connection capabilities. A full duplex connector is a connector that allows for the transmission of data in two directions, simultaneously. The full duplex USB-C connector enables compatible electronic devices to cross talk, supply power, consume power, etc., simultaneously.

Additionally, the USB-C standard supports the technical specifications supported by USB-A, along with the Universal Serial Bus 3.1 (USB 3.1) and Universal Serial Bus Power Delivery (USB PD) specifications. The USB 3.1 specification supports a higher maximum data transfer rate (e.g., capable of transferring data at 20 Gbit/s) than supported by previous specifications (e.g., USB 1.0, USB 1.1, USB 2.0, and USB 3.0). The USB PD specification supported by the USB-C standard allows for higher power (e.g., up to 100 W) transfer limits than allowed by previous specifications (e.g., USB 1.0, USB 1.1, USB 2.0, and USB 3.0). The USB-C standard supports all legacy specifications supported by the USB-A standard.

Electrical specifications and standards supported by the USB-C standard (e.g., USB-C connectors) include a main voltage bus ($V_{BUS\_C}$) in the female connector. The main voltage bus ($V_{BUS\_C}$) may also be included on the male connector. For USB-C source and/or DRP devices, the main voltage bus ($V_{BUS\_C}$) includes a voltage potential of zero volts. An electrical standard supported by the USB-C standard (e.g., USB-C connectors) includes zero voltage potential across $V_{BUS\_C}$ in the male connector while a USB-C device is unattached (e.g., a cold socket when there is no connected device). The USB-C standard does not enable voltage across its respective main voltage bus (e.g., no voltage potential across $V_{BUS\_C}$) due to standards set by the USB-C manufacturers.

In comparison to the USB-A standard, the USB-C standard includes physically smaller male and female connectors. For example, the USB-C connector is about 8.25 millimeters in width and 2.4 millimeters in height. Whereas, the USB-A connector is about 12 millimeters in width and 4.5 millimeters in height. The USB-C standard can support the legacy specifications of the USB-A standard (e.g., USB 1.0, USB 1.1, USB 2.0, and USB 3.0), and therefore, there are often instances of USB-A to USB-C connections. USB-A to USB-C adapters are used to link a USB-A compatible device with a USB-C compatible device. Typically, the USB-A to USB-C adapter includes a USB-A female connector and a USB-C male connector. In this manner, the USB-A female connector of the adapter can receive the USB-A male connector from a USB-A compatible device (e.g., a USB-A source or sink), and the USB-C male connector of the adapter can plug into the USB-C female connector of the USB-C compatible device (e.g., device housing the USB-C female connector).

Due to the different electrical protocols for USB-A and USB-C devices (e.g., different regulations for the respective main voltage busses), problems can arise when connecting a USB-A compatible device to USB-C compatible device. For example, if a USB-A compatible device supplying power (e.g., USB-A source) connects to a USB-C compatible device (e.g., through utilizing a USB-A to USB-C adapter such as a USB-A to USB-C cable), a initial inrush of current may occur. The initial inrush of current occurs due to the different voltage potentials at the USB-A compatible device voltage bus (e.g., $V_{BUS\_A}$) and USB-C compatible device voltage bus (e.g., $V_{BUS\_C}$). Since the voltage across the voltage bus in the USB-C connector ($V_{BUS\_C}$) is close to zero, the connector with the higher $V_{BUS}$ voltage (e.g., USB-A male connector) will drive current into the other connector (e.g., USB-C female connector). For example, if a USB-A compatible cellular phone acts as a USB-A source, the USB-A compatible cellular phone may have a five-volt potential on the main voltage bus (e.g., $V_{BUS\_A}$). Furthermore, if the USB-A compatible cellular phone is connected to USB-C compatible device (e.g., a USB-C compatible device including a zero-volt potential on the main voltage bus $V_{BUS\_C}$), utilizing a USB-A to USB-C adapter, the five-volt potential on the USB-A compatible cellular phone main voltage bus (e.g., $V_{BUS\_A}$) may cause inrush current to be driven in to the USB-C comparable device. When inrush current flows into a connector that should not have current flowing into it, the USB-A compatible device or USB-C compatible device may be damaged.

Prior attempts to reduce the amount of initial inrush current flowing into a connector that should not have current flowing into it include adding a transistor (e.g., a switch) on the USB-C compatible device side connector. This transistor is designed to block the initial inrush of current that may occur when plugging a USB-A compatible device (e.g., USB-A source) into a USB-C compatible device. For example, the transistor may be turned off (e.g., not conduct) when anticipating a USB-A device to be plugged in to block the initial inrush of current. Alternatively, prior attempts to reduce the amount of initial inrush current into a USB-C device include utilizing a voltage bus capacitor coupled to the voltage bus in the USB-C device (e.g., voltage bus capacitor coupled to the voltage bus in the female connector of a USB-C compatible device). The voltage bus capacitor is designed to store the charge resulting from the initial inrush of current. Due to device standards (e.g., standards initiated by USB-C manufacturers), the voltage bus capacitor is minimized to a value that is incapable of storing all of the charge resulting from the initial inrush of current.

FIG. 1 is a schematic 100 illustrating a USB-C female connector 102 coupled to a USB-A device 104 through an USB-A to USB-C adapter 103. The USB-C schematic 100 includes a voltage bus capacitor 106 and a blocking transistor 108. The voltage bus capacitor 106 is coupled between the ground node 110 and a source terminal 112 of the blocking transistor 108. Furthermore, the USB-C schematic 100 includes a system capacitor 114. The system capacitor 114 is coupled between the ground node 110 and a drain terminal 116 of the blocking transistor 108.

In the illustration depicted in FIG. 1, the USB-C female connector 102 is connected to the example USB-A device 104. The USB-A device 104 is connected to the USB-C female connector 102 using a USB-A to USB type C adapter 103.

The example USB-A device 104 utilizes the USB-A standards (e.g., USB-A electrical characteristics and physical connections) of operation. When a USB-A device 104 is plugged into the USB-C female connector 102, an initial inrush of current (Current A) conducts into the USB-C female connector 102. The initial inrush of current (Current A) occurs when the USB-A device 104 supplies power (e.g., acts as a USB-A source) to the USB-C female connector 102, or when the USB-A device 104 includes a voltage potential (e.g., five volts) across the main voltage bus (e.g., $V_{BUS\_A}$) and the USB-C female connector 102 includes zero voltage potential across its respective main voltage bus (e.g., $V_{BUS\_C}$ or node 120).

The voltage bus capacitor 106 is a large (e.g., ten microfarad) capacitor that stores energy proportional to the current conducting through it (Current B). The current (e.g., Current B) conducting through the voltage bus capacitor 106 is generated from the initial inrush of current (Current A).

The blocking transistor 108 in FIG. 1 is an n-channel metal-oxide-semiconductor (NMOS) field-effect transistor. The blocking transistor 108 includes a source terminal 112, a drain terminal 116 and a parasitic body diode 118.

The ground node 110 provides a reference voltage for the USB-C schematic 100. In the illustration depicted in FIG. 1 the ground node 110 is a chassis ground.

The system capacitor 114 is relatively larger than the voltage bus capacitor 106 (e.g., a six hundred microfarad capacitor). When a USB-A device 104 is plugged into the USB-C female connector 102, current, Current C, conducts through the parasitic body diode 118 of the blocking transistor 108.

In the illustration depicted in FIG. 1, the USB-A device 104 is plugged into the USB-C female connector 102. Due to a voltage potential existing at the USB-A device 104 (e.g., a five-volt potential across $V_{BUS\_A}$), an initial inrush of current conducts into the USB-C female connector 102 (Current A). The initial inrush of current (Current A) conducts through the parasitic body diode 118 (e.g., Current C) of the example blocking transistor 108. In this scenario, the parasitic body diode 118 conducts current because the voltage drop across the anode terminal (the source terminal 112) and the cathode terminal (the drain terminal 116) exceeds the conduction threshold of the parasitic body diode 118 (e.g., 0.7 volts). When this occurs, the USB-A device 104 is conducting current (Current C) through the parasitic body diode 118 to the system capacitor 114. The current conducting through the parasitic body diode 118 (Current C) may cause damage to the USB-C compatible device (e.g., the device housing the USB-C female connector 102) and/or the USB-A device 104.

Prior attempts to account for the current flowing through the inherent parasitic body diode of the transistor include adding a second transistor in series with the first transistor. In these attempts, the second transistor includes a parasitic body diode that conducts current when the polarity of the voltage drop across the parasitic body diode it opposite of the polarity of the voltage drop across the parasitic body diode in the first transistor. This attempt is costly to implement because this implementation uses twice the number of transistors.

Figure 2:
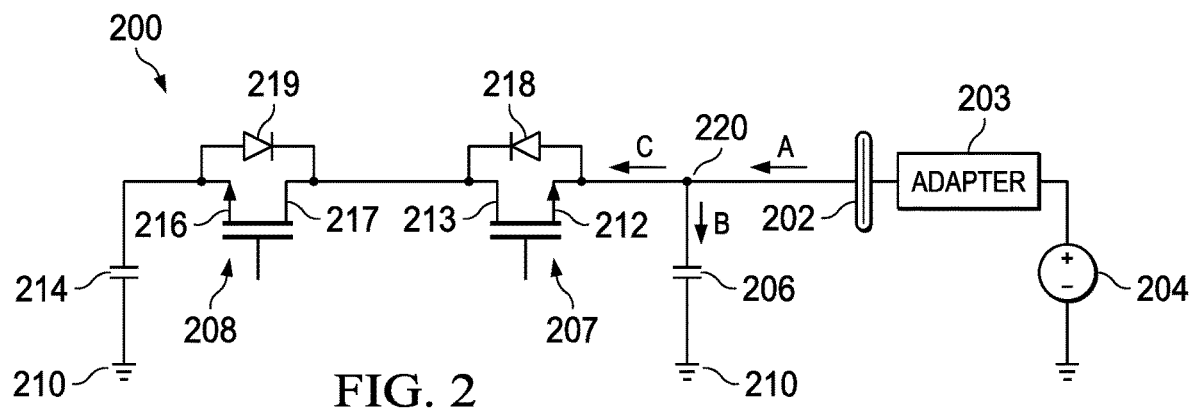
FIG. 2 is a schematic illustrating a USB-C system including a USB-C female connector coupled to a USB-A device through an adapter, further including two blocking transistors.

FIG. 2 is a schematic 200 illustrating a USB-C female connector 202 coupled to a USB-A device 204 through a USB-A to USB-C adapter 203, further including two blocking transistors 207, 208. The USB-C schematic 200 includes a voltage bus capacitor 206 and two blocking transistors 207, 208. The blocking transistors 207, 208 are n-channel metal-oxide-semiconductor (NMOS) field-effect transistors. The voltage bus capacitor 206 is coupled to the ground node 210 and the source terminal 212 of the blocking transistor 207. Furthermore, the USB-C schematic 200 includes a system capacitor 214. The system capacitor 214 is coupled between the ground node 210 and a source terminal 216 of the blocking transistor 208.

In the illustration depicted in FIG. 2, the USB-C female connector 202 is connected to the example USB-A device 204. The USB-A device 204 is connected to the USB-C female connector 202 using a USB-A to USB type C adapter 203.

The example USB-A device 204 utilizes the USB-A standards (e.g., USB-A electrical characteristics and physical connections) of operation. When a USB-A device 204 is plugged into the USB-C female connector 202, an initial inrush of current (Current A) conducts into the USB-C female connector 202. The initial inrush of current (Current A) occurs when the USB-A device 204 supplies power (e.g., acts as a USB-A source) to the USB-C female connector 202, or when the USB-A device 204 includes a voltage potential (e.g., five volts) across the main voltage bus (e.g., $V_{BUS\_A}$) and the USB-C female connector 102 includes zero voltage potential across its respective main voltage bus (e.g., $V_{BUS\_C}$ or node 220).

The voltage bus capacitor 206 is a large (e.g., ten-microfarad) capacitor. The voltage bus capacitor 206 stores energy proportional to the current conducting through it (Current B). The current (e.g., Current B) conducting through the voltage bus capacitor 206 is generated from the initial inrush of current (Current A).

The blocking transistor 207 in FIG. 2 is an n-channel metal-oxide-semiconductor (NMOS) field-effect transistor. The blocking transistor 207 includes the source terminal 212, a drain terminal 213 and a parasitic body diode 218. The blocking transistor 208 of FIG. 2 includes a drain terminal 217, the source terminal 216 and a parasitic body diode 219.

The ground node 210 provides a reference voltage for the USB-C schematic 200. In the illustration depicted in FIG. 2 the ground node 210 is a chassis ground.

The system capacitor 214 is relatively larger than the voltage bus capacitor 214 (e.g., a six hundred-microfarad capacitor). When a USB-A device 204 is plugged into the USB-C female connector 202, current, Current C, conducts through the parasitic body diode 218 of the blocking transistor 207.

In the illustration depicted in FIG. 2, the USB-A device 204 is plugged into the USB-C female connector 202. Due to a voltage potential existing at the USB-A device 204, an initial inrush of current (Current A) conducts into the USB-C female connector 202. The initial inrush of current (Current A) conducts through the parasitic body diode 218 of the example blocking transistor 207 (e.g., Current C). In the illustration depicted in FIG. 2, the current (Current C) conducting through the parasitic body diode 218 is blocked by the parasitic body diode 219. The illustration depicted in FIG. 2 utilizes two transistors (e.g., blocking transistors 207 and 208) to block the initial inrush of current from the USB-A device 204. The illustration depicted in FIG. 2 includes twice the amount of blocking transistors used in examples disclosed herein.

Examples disclosed herein allow for the protection of USB devices when connecting a USB-A compatible device to a USB-C compatible device. Furthermore, examples disclosed herein include utilizing a single transistor to block the initial inrush of current when connecting a USB-A compatible device to a USB-C compatible device. Examples disclosed herein include utilizing the system side capacitor (e.g., the large capacitance on the system side of the transistor in a USB-C device) to reverse bias the parasitic body diode of the blocking transistor.

Examples disclosed herein include the ability to pre-charge the system side capacitor (e.g., the large capacitance on the system side of the transistor in a USB-C device). In examples disclosed herein, the system side capacitor (e.g., the large capacitance on the system side of the transistor in a USB-C device) is pre-charged to a voltage large enough to reverse bias the parasitic body diode in the transistor. Some examples include pre-charging the system side capacitance (e.g., the large capacitance on the system side of the transistor in a USB-C device) to five volts; however, examples disclosed herein include pre-charging the system side capacitor to any numerical voltage value.

Examples disclosed herein include preventing inrush current that occurs when attaching (e.g., connecting) a USB-A host (e.g., USB-A source) and/or a USB-A device (e.g., USB-A sink) into a USB-C dual role power device (DRP). Examples disclosed herein include verifying the state of the USB-A host (e.g., USB-A source) and/or the USB-A device (e.g., USB-A sink) and adjusting the power flow in the USB-C dual role power (DRP) device to accommodate the state of the USB-A host (e.g., USB-A source) and/or a USB-A device (e.g., USB-A sink). Examples disclosed herein are not limited to preventing inrush current that occurs when attaching a USB-A standard device (e.g., USB-A host and/or USB-A device) into a USB-C DRP device, and in fact, include preventing inrush current that may occur when attaching any other device (e.g., USB-C Standard Device) into a USB-C DRP device. For example, the inrush current that may occur when attaching (e.g., connecting) a USB-C DRP device to a USB-C DRP device may be prevented in examples disclosed herein.

Examples disclosed herein include preventing the initial inrush of current in a USB-C device that may occur when verifying and/or adjusting for the state of a connected USB-A host (e.g., USB-A source), a USB-A device (e.g., USB-A sink), a USB-C DRP device, or any other USB capable device and/or host.

Figure 3:
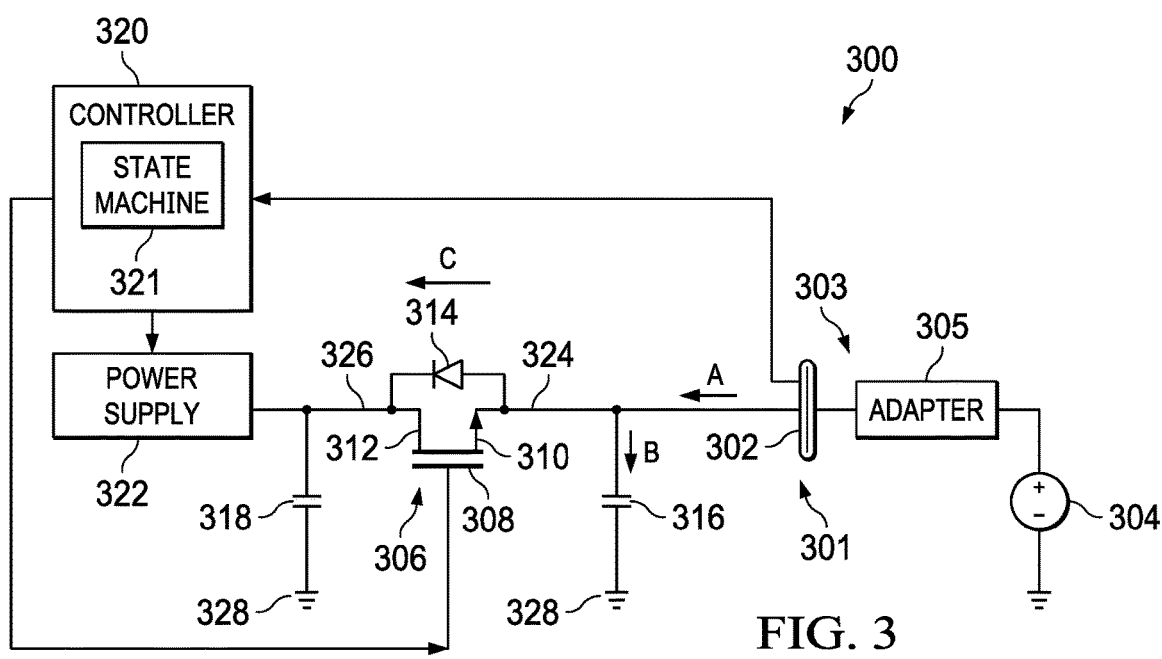
FIG. 3 is a schematic illustrating a USB-C system coupled to a USB-A system.

FIG. 3 is a schematic 300 illustrating a USB-C system 301 coupled to a USB-A system 303. The example USB-C system 301 includes the components and/or devices housed by a USB-C compatible device (e.g., dock, monitor). Example components and/or devices included in the USB-C system 301 include an example voltage bus capacitor 316, an example blocking transistor 306, an example system capacitor 318, an example controller 320, and an example universal serial bus type-C female connector 302 (USB-C female connector 302). In other examples disclosed herein, the USB-C female connector 302 may be a universal serial bus type-c connector or any suitable universal serial bus connector. Additionally, in examples disclosed herein, the USB-C female connector 302 is a universal serial bus type-c power delivery compatible connector that is compatible with universal serial bus type-c power delivery applications. The example USB-A system 303 includes the components and/or devices housed by an example universal serial bus type-A device 304 (USB-A device 304), along with an example universal serial bus type-a to universal serial bus type-c adapter 305 (USB-A to USB-C adapter 305). In other examples disclosed herein, the USB-A device 304 may be a universal serial bus type-A host, a universal serial bus type-C DRP device, or any other universal serial bus compatible device.

The USB-C system 301 may be located in a universal serial bus compatible device such as a host device (e.g., personal computer, laptop, dock); however, the USB-C system 301 may be located in other devices as well (e.g., peripheral devices). In the USB-C system 301, the voltage bus capacitor 316 is coupled to the example ground node 328 and the example current terminal 310 (e.g., source terminal) of the blocking transistor 306. The system capacitor 318 is coupled to the ground node 328 and the current terminal 312 (e.g., drain terminal) of the blocking transistor 306. Additionally, the power supply 322 is coupled to the current terminal 312 (e.g., drain terminal) and the system capacitor 318. An example controller 320 is coupled to the power supply 322, the blocking transistor 306, and the example USB-C female connector 302.

In the example depicted in FIG. 3, the USB-C female connector 302 is connected to the example USB-A device 304 through the example USB-A to USB-C adapter 305. Examples disclosed herein are not limited to the USB-A device 304, and in fact, some examples disclosed herein include a second USB-C compatible device connected to the USB-C female connector 302. The USB-C female connector 302 includes full duplex (e.g., ability simultaneously communicate host-to-device or device-to-host) connection capabilities. The full duplex USB-C connector (e.g., the USB-C female connector 302) enables compatible electronic devices to cross talk, supply power, consume power, etc., simultaneously. The device housing the USB-C system 301 may supply power and/or consume power to a device connected to the USB-C female connector 302.

Additionally, the USB-C female connector 302 may support the specifications supported by USB-A (e.g., USB 1.0, USB 1.1, USB 2.0, USB 3.0), along with the Universal Serial Bus 3.1 (USB 3.1) and Universal Serial Bus Power Delivery specifications. The USB-C female connector 302 may support all legacy specifications supported by the USB-A standard. Furthermore, the USB-C female connector 302 includes a USB-C main voltage bus 324 (e.g., $V_{BUS\_C}$). Ideally, the USB-C main voltage bus 324 (e.g., $V_{BUS\_C}$) has a zero-voltage potential while a device is anticipated to be plugged in.

The example USB-A device 304 is connected to the USB-C female connector 302 using the USB-A to USB-C adapter 305. In some examples disclosed herein, the USB-A device 304 may be a USB-C compatible device, and thus, a USB-C compatible device may be connected to the USB-C female connector 302 (e.g., attaching a male USB-C connector from a USB-C compatible device into the USB-C female connector 302 of FIG. 3).

In the example illustrated in FIG. 3, the USB-A device 304 is coupled to the USB-C female connector 302 to consume power from the device housing the USB-C system 301. Other examples disclosed herein include coupling the USB-A device 304 to the USB-C female connector 302 to supply power to the device housing the USB-C system 301. The example USB-A device 304 utilizes the USB-A standards (e.g., USB-A electrical characteristics and physical connections) of operation. In some examples disclosed herein, the USB-A device 304 may supply power to a dock, monitor, or personal computer (e.g., the dock, monitor, or personal computer includes the USB-C female connector 302). Other examples disclosed herein include a USB-A device 304 to connect and/or communicate with a USB-type C compatible device (e.g., dock, monitor, or personal computer). Additionally, some examples disclosed herein include a USB-C compatible device to connect and/or communicate with another USB-C compatible device (e.g., dock, monitor, or personal computer).

The example blocking transistor 306 is an n-channel metal-oxide-semiconductor field-effect transistor (NMOS). In other examples, the blocking transistor 306 may be an p-channel metal-oxide-semiconductor field-effect transistor (PMOS) or any other switching device. The blocking transistor 306 includes a gate terminal 308, a current terminal 310 (source terminal), a current terminal 312 (e.g., drain terminal), and a parasitic body diode 314. In the example depicted in FIG. 3, the blocking transistor 306 includes a gate terminal 308 coupled to a controller 320.

The example gate terminal 308 of the blocking transistor 306 receives an input signal from the example controller 320. The input signal received at the gate terminal 308 of the blocking transistor 306 may be a pulse width modulation (PWM) signal. The PWM signal is a periodic signal having a frequency with a respective on-time and off time.

The example current terminal 310 (e.g., source terminal) of the blocking transistor 306 is coupled to the voltage bus capacitor 316 and the USB-C female connector 302 (e.g., the USB-C main voltage bus 324). The current terminal 312 (e.g., drain terminal) of the blocking transistor 306 is coupled to the example system capacitor 318 and the power supply 322.

Additionally, the blocking transistor 306 includes an example parasitic body diode 314. The parasitic body diode 314 is a parasitic diode that conducts current when a voltage drop between the anode (e.g., current terminal 310) and the cathode (e.g., current terminal 312) exceeds a conduction threshold. In some examples, the conduction threshold is 0.7 volts; however, the conduction threshold amount is not limited to any value disclosed herein. The parasitic body diode 314 is an inherent result from manufacturing the example blocking transistor 306. When the blocking transistor 306 is conducting (e.g., a turn on signal has been sent by the controller 320) the current carried by the parasitic body diode (Current C) is negligible. For example, when the blocking transistor 306 is conducting (e.g., a turn on signal has been sent by the controller 320), the current conducting through the current terminal 310 (e.g., source terminal) to the current terminal 312 (e.g., drain terminal) may be three amperes, and the current conducting through the parasitic body diode 314 may be one microampere. Other examples include when the blocking transistor 306 is not conducting (e.g., a turn-off signal has been sent by the controller 320). In these examples, the current conducting through the current terminal 310 (e.g., source terminal) to the current terminal 312 (e.g., drain terminal) is zero amperes, and the current conducting through the parasitic body diode 314 may be one microampere. Other examples disclosed herein include a current conducting through the parasitic body diode 314, while the blocking transistor 306 is conducting or not conducting, of any numerical ampere value (e.g., one ampere, 5 amperes, 10 amperes). The conduction of current through the parasitic body diode 314 when the blocking transistor 306 is not conducting may cause damage to the USB-C device (e.g., the device that includes the USB-C system 301), the USB-A device 304, or any other USB device attached to the USB-C female connector 302 (e.g., a USB-C compatible device).

The example voltage bus capacitor 316 is a two terminal electrical component that stores energy in an electric field. In examples disclosed herein, the example voltage bus capacitor 316 includes a large (e.g., ten-microfarad) capacitor. When a USB-A device 304 is plugged into the USB-C female connector 302, an initial inrush of current (Current A) conducts into the USB-C female connector 302. In the example depicted in FIG. 3, the initial inrush of current (Current A) occurs due to the difference in voltage potential across the USB-A voltage bus (e.g., $V_{BUS\_A}$) and the USB-C voltage bus 324 (e.g., $V_{BUS\_C}$). Alternatively, the initial inrush of current (Current A) may occur due to a difference in voltage potential between the USB-C voltage bus 324 (e.g., $V_{BUS\_C}$) and any other device and/or host connected to the USB-C female connector 302 (e.g., an additional USB-C compatible device). The voltage bus capacitor 316 stores energy proportional to the current conducting through it (Current B). The current (e.g., Current B) conducting through the voltage bus capacitor 316 is generated from the initial inrush of current (Current A).

The example system capacitor 318 is a two terminal electrical component that stores energy in an electric field. In examples disclosed herein, the system capacitor 318 includes a capacitance predesignated by the USB-C compatible device manufacturer (e.g., 100 microfarads, 200 microfarads, 600 microfarads, etc.). The example system capacitor 318 is coupled to the power supply 322. In examples disclosed herein, the system capacitor 318 is pre-charged to a voltage potential that will reverse bias the parasitic body diode 314. The parasitic body diode 314 conducts when the voltage drop across the parasitic body diode 314 (e.g., voltage drop from the USB-C main voltage bus 324 to the system node 326) satisfies the conduction threshold voltage (e.g., a threshold voltage of 0.7 volts).

The example controller 320 is coupled to the power supply 322, the blocking transistor 306, and the USB-C female connector 302. The controller 320 may be implemented by one or more integrated circuits, logic circuits, microprocessors, graphics processing units (GPUs), digital signal processors (DSPs), or controllers from any desired family or manufacturer. Other examples disclosed herein include the controller 320 integrated within the device housing the USB-C female connector 302 (e.g., the processor within a personal computer housing a USB-C female connector 302). Additionally or alternatively, the controller 320 may be implemented externally from the device housing the USB-C female connector 302 (e.g., a personal computer housing a USB-C female connector) in one or more integrated circuits, logic circuits, microprocessors, GPUs, DSPs, or controllers from any desired family or manufacturer.

The controller 320 sends a turn on and/or off signal to the blocking transistor 306. Additionally, the controller 320 sends a trigger signal (e.g., PWM signal) to the power supply 322 indicating whether or not to pre-charge the system capacitor 318. In some examples disclosed herein, the turn on and/or off signal sent to the blocking transistor 306 may be the same signal sent to the power supply 322. In examples disclosed herein, the controller 320 is connected to the USB-C female connector 302 to obtain a reference value indicative of whether or not a device is attached (e.g., connected) or unattached (e.g., not connected) to the USB-C female connector 302. For example, if no device is connected, the reference value may be indicative of no connection (e.g., the reference value may be zero). The controller 320 may be connected to a pin on the USB-C female connector 302 such as the configuration channel pin; however, any other method of connecting the controller 320 to the USB-C female connector 302 may be used.

The example state machine 321 is located in the controller 320. The example state machine 321 is any device that obtains and stores the status (e.g., state) of the reference value at the USB-C female connector 302. Furthermore, in response to the state of the reference value obtained from the USB-C female connector 302, the state machine 321 may generate commands to be sent to the blocking transistor 306 and/or the power supply 322. Additionally, the state machine 321 may serve as a communication link to the device connected to the USB-C female connector 302 (e.g., the USB-A device 304) to negotiate a new contract of operation. Example contracts of operation include indicating which device (e.g., the device housing the USB-C schematic 300 or the USB-A device 304) is to supply and/or consume power. The state machine 321 may be implemented using hardware such as a logic circuit, software, or any combination of hardware and/or software.

The example power supply 322 is coupled to the controller 320 and the system node 326. The system node 326 is the node where the system capacitor 318 is coupled to the current terminal 312 (e.g., drain terminal) of the blocking transistor 306. The example power supply 322 is included in the USB-C compatible device (e.g., the device which includes the USB-C female connector). In some examples disclosed herein, the power supply 322 may be a power converter (e.g., buck converter, boost converter, buck-boost converter, etc.), a battery, a switched mode power supply, and/or transformer. The power supply 322 may be implemented externally to the USB-C schematic 300 (e.g., USB-C female connector 302, blocking transistor 306, voltage bus capacitor 316, system capacitor 318, and/or the controller 320).

The power supply 322 is controlled by the controller 320 through a series of signals and/or commands. Example signals and/or commands may be generated using a digital-to-analog converter (DAC), an array of switches and/or transistors, and/or a control line. In some examples disclosed herein, the power supply 322 operates continuously, periodically, aperiodically and/or based on a trigger. In examples disclosed herein, the trigger is generated by the controller 320. Other examples disclosed herein may include a power supply 322 utilizing alternating current (AC) (e.g., an alternating current to direct current power converter, alternating current to alternating current power converter, alternating current transformer).

The voltage at the system node 326 is equivalent to the magnitude of the voltage drop across the system capacitor 318. In order to reverse bias the parasitic body diode 314, the voltage drop from the system node 326 to the USB-C main voltage bus 324 should be less than the parasitic body diode 314 conduction threshold (e.g., 0.7 volts). The example illustrated in FIG. 3 includes a five-volt USB-A device 304, thus, the voltage at the USB-C main voltage bus 324 is five volts. Furthermore, in the example disclosed in FIG. 3, to reverse bias the parasitic body diode 314, the voltage at the system node 326 (e.g., voltage across the system capacitor 318) is pre-charged to a voltage potential greater than the voltage at the USB-C main voltage bus 324 minus the conduction threshold (e.g., pre-charge the system capacitor 318 to a voltage potential greater than 4.3 volts). Examples disclosed herein are not limited to specific voltage magnitudes. Furthermore, examples disclosed herein include pre-charging the system capacitor 318 to any voltage magnitude that can reverse bias the parasitic component(s) (e.g., the parasitic body diode 314) in the blocking transistor 306. Examples disclosed herein include pre-charging the system capacitor 318 to a voltage potential that ensures the conduction threshold of the parasitic body diode 314 is not satisfied. The system capacitor 318 may be pre-charged by sending a trigger to the power supply 322, therefore notifying the power supply 322 to supply power to the system capacitor 318. In some examples disclosed herein, power may be supplied as a voltage from the power supply 322.

The ground node 328 provides a reference voltage for the USB-C schematic 300. In the illustration depicted in FIG. 3 the ground node 328 is a chassis ground; however, they manner in which the USB-C schematic 300 is grounded may vary. For example, the ground node 328 may be earth ground, analog ground, digital ground, or any other voltage reference.

Figure 4:
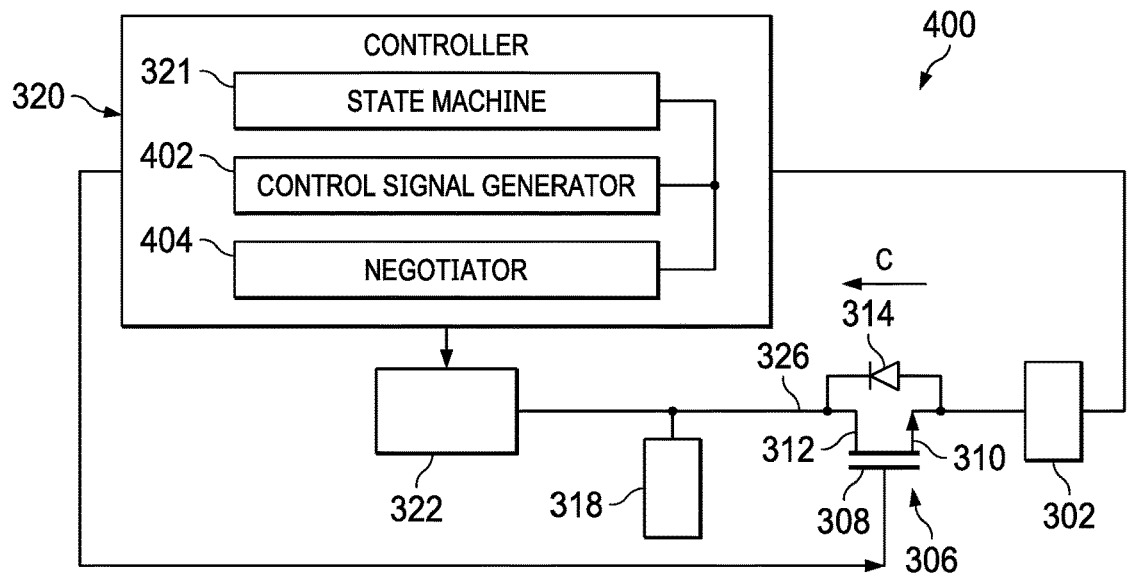
FIG. 4 is a block diagram showing additional detail of an example controller that may be used in combination the USB-C system of FIG. 3.

FIG. 4 is a block diagram 400 of further detail of the example controller 320 of FIG. 3 that may be used in combination the USB-C schematic 300 of FIG. 3. The example controller 320 includes the state machine 321 of FIG. 3, an example control signal generator 402, and an example negotiator 404. The state machine 321, control signal generator 402, and negotiator 404 are communicatively connected. For the purposes of driving the power supply 322 and/or blocking transistor 306, the controller 320 receives a reference value from a communication pin located in the USB-C female connector 302. An example communication pin may be any pin located in the USB-C female connector capable of communicating the state of connection (e.g., whether a device is connected or not connected) to the controller 320. The controller 320 produces two outputs that trigger the power supply 322 and the blocking transistor 306. The number of inputs and produced outputs in the controller 320 may vary.

The example state machine 321 receives the reference value from the USB-C female connector 302. The state machine 321 communicates with the control signal generator 402 and the negotiator 404 to serve as a communication link. The state machine 321 determines if the reference value received from the USB-C female connector 302 is indicative of a connected device or not. Additionally, after determining if the reference signal indicates a connected device or not, the state machine 321 communicates the indication of the result (e.g., whether a device is connected or not connected to the USB-C female connector 302) to the control signal generator 402. For example, if the state machine 321 determines that a device is connected to the USB-C female connector 302, an indication of the connected device is communicated to the control signal generator 402. Likewise, if the state machine 321 determines that a device is not connected to the USB-C female connector 302, an indication the unattached connection is communicated to the control signal generator 402.

The example control signal generator 402 communicates with the state machine 321 to receive the indication of the result (e.g., whether a device is connected or not connected to the USB-C female connector 302). The control signal generator 402 generates a control signal in response to the indication received to turn on and/or turn off the power supply 322 and/or the blocking transistor 306. For example, if the control signal generator 402 receives an indication from the state machine 321 of a device connected to the USB-C female connector 302, the control signal generator 402 may generate a signal to turn on the blocking transistor 306 and a signal to modify the operation of the power supply 322. Likewise, if the control signal generator 402 receives an indication from the state machine 321 of no device connected to the USB-C female connector 302, the control signal generator 402 may generate a signal to turn off the blocking transistor 306 and a signal to change the operation of the power supply 322 to pre-charge the system capacitor 318 of FIG. 3. In other examples, the polarity of the indication from the state machine 321 may alter the actions of the control signal generator 402. In some examples disclosed herein, the control signal generator 402 generates the control signal in response to an indication received from the negotiator 404 of a negotiation status.

The example negotiator 404 communicates with the state machine 321 and the example control signal generator 402. The negotiator 404 facilitates communication with a device connected to the USB-C female connector 302. In examples disclosed herein, the negotiator 404 responds to the determination from the state machine 321 of a connected device by negotiating a contract with the connected device to have the connected device act as a sink. In such examples, after the negotiator 404 negotiates the contract with the connected device, the controller 320 enters in a source mode (e.g., the controller 320 is facilitating the sourcing of power to the connected device).

The controller 320 of the illustrated example is hardware. For example, the controller 320 can be implemented by one or more integrated circuits, logic circuits, microprocessors, GPUs, DSPs, or controllers from any desired family or manufacturer. The hardware controller 320 may be a semiconductor based (e.g., silicon based) device. The processor platform can be, for example, a server, a personal computer, a workstation, a dock, a monitor, a self-learning machine (e.g., a neural network), a mobile device (e.g., a cell phone, a smart phone, a tablet), a personal digital assistant (PDA), an Internet appliance, a DVD player, a CD player, a digital video recorder, a Blu-ray player, a gaming console, a personal video recorder, a set top box, a headset or other wearable device, or any other type of computing device. In other examples disclosed herein, the controller 320 may be implemented as an embedded system in which the state machine 321 and/or the control signal generator 402 may be implemented as software and/or hardware.

In the illustrated example of FIG. 4, the controller 320 and the blocking transistor 306 are implemented together in an integrated circuit (e.g., on a chip, etc.). In FIG. 4, the controller 320 and the blocking transistor 306 are configured to be connected to the USB-C female connector 302, the system capacitor 318, and to the power supply 322. In other examples disclosed herein, the state machine 321, the control signal generator 402, and/or the negotiator 404 may be implemented internally or externally from the controller 320. Likewise, in other examples disclosed herein, the controller 320 and the blocking transistor 306 may be implemented in separate IC's.

Figure 5:
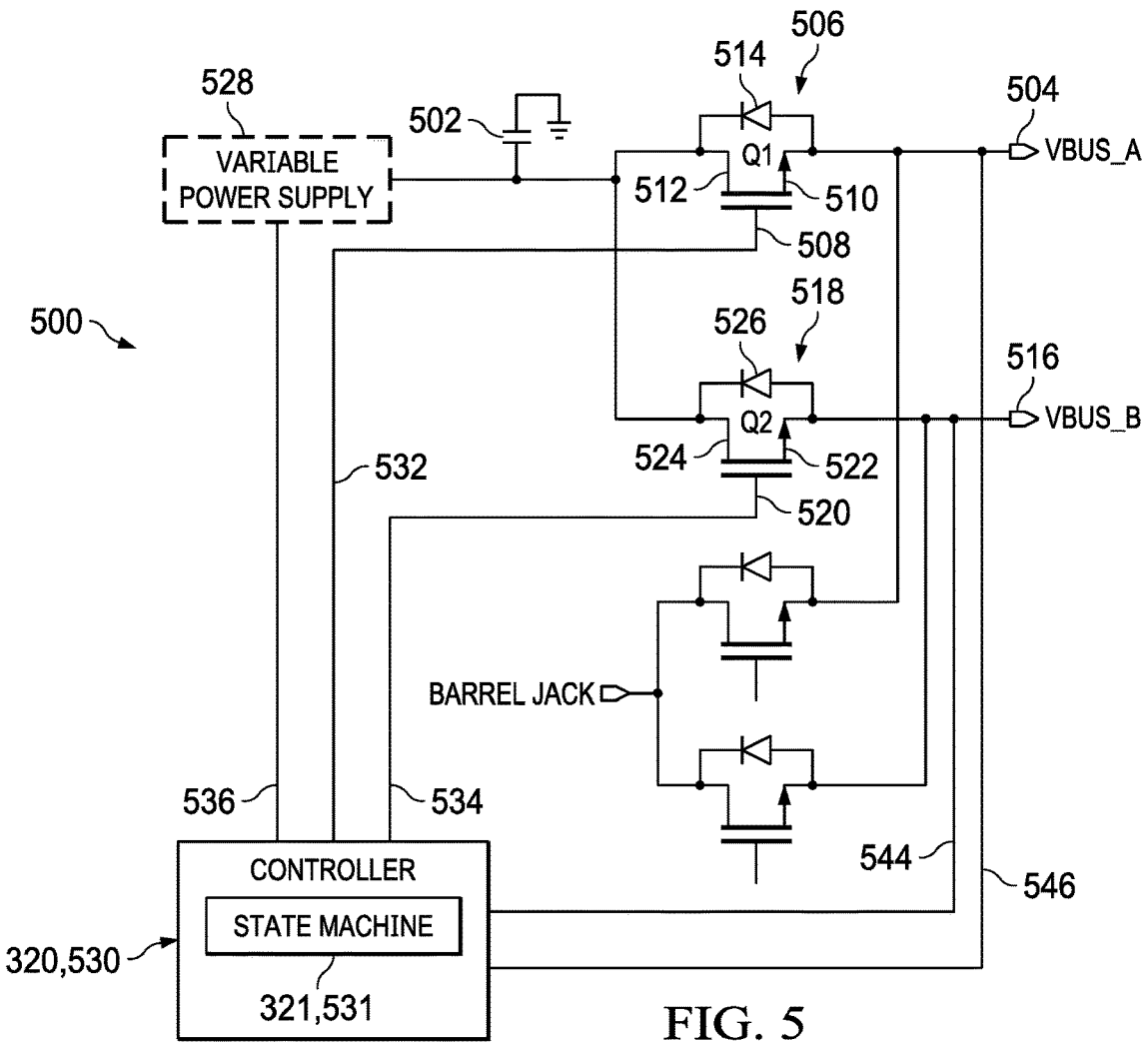
FIG. 5 is a schematic illustrating an example dual-port device coupled to an example controller to control an example variable power supply.

FIG. 5 illustrates a dual-port device 500 coupled to an example controller 530 to control an example variable power supply 528. Among various components depicted in FIG. 5, the dual-port device 500 illustrates includes two USB-C female connectors (504, 516). Furthermore, illustrated in FIG. 5 is a variable power supply 528 coupled to the example system capacitor 502. The example system capacitor 502 is coupled in series with the blocking transistor 506 and the USB-C female connector 504. Additionally, the system capacitor 502 is coupled in series with the blocking transistor 518 and the USB-C female connector 516. The first blocking transistor 506 is coupled to the first USB-C female connector 504, and the second blocking transistor 518 is coupled to the second USB-C female connector 516. The example dual-port device 500 includes an example controller 530 and an example state machine 531. In examples disclosed herein, the controller 530 may be implemented as the controller 320 of FIG. 3 and the state machine 531 may be implemented as the state machine 321 of FIG. 3.

The first USB-C female connector 504 is coupled to the first blocking transistor 506. The first USB-C female connector 504 is located on a host device (e.g., personal computer, laptop, dock); however, the first USB-C female connector 504 may be located on other devices as well (e.g., peripheral devices). The first USB-C female connector 504 includes full duplex connection capabilities (e.g., ability simultaneously communicate host-to-device or device-to-host). A full duplex connector (e.g., the first USB-C female connector 504) is a connector that allows for the transmission of data in two directions, simultaneously. The full duplex USB-C connector (e.g., the first USB-C female connector 504) enables compatible electronic devices to cross talk, supply power, and/or consume power, simultaneously. Additionally, in some examples disclosed herein, the first USB-C female connector 504 is a universal serial bus type-c power delivery compatible connector that is compatible with universal serial bus type-c power delivery applications.

Additionally, the first USB-C female connector 504 supports the specifications supported by USB-A (e.g., USB 1.0, USB 1.1, USB 2.0, USB 3.0), along with the Universal Serial Bus 3.1 (USB 3.1) and Universal Serial Bus Power Deliver (USB PD) specifications. The first USB-C female connector 504 supports all legacy specifications supported by the USB-A standard.

The example first blocking transistor 506 is an n-channel metal-oxide-semiconductor field-effect transistor (NMOS). In other examples, the first blocking transistor 506 may be an p-channel metal-oxide-semiconductor field-effect transistor (PMOS) or any other switching device. The first blocking transistor 506 includes three current terminals (e.g., gate terminal 508, current terminal 510 (e.g., source terminal), and current terminal 512 (e.g., drain terminal)) and a first parasitic body diode 514. In the example depicted in FIG. 5, the first blocking transistor 506 includes a gate terminal 508 coupled to a controller 530.

The example gate terminal 508 of the first blocking transistor 506 receives an input signal from the example controller 530. The input signal received at the gate terminal 508 of the first blocking transistor 506 may be a pulse width modulation (PWM) signal. The PWM signal is a periodic signal having a frequency with a respective on-time and off time.

The example current terminal 510 (e.g., source terminal) of the first blocking transistor 506 is coupled to the first USB-C female connector 504. The node shared by the current terminal 510 (e.g., source terminal) and the first USB-C female connector 504 is coupled to the controller 530. The current terminal 512 (e.g., drain terminal) of the first blocking transistor 506 is coupled to the example system capacitor 502 and the variable power supply 528.

Additionally, the first blocking transistor 506 includes a first example parasitic body diode 514. The first parasitic body diode 514 is a parasitic diode that conducts current when a voltage drop between the anode (e.g., current terminal 510) and the cathode (e.g., current terminal 512) exceeds a conduction threshold. In some examples, the conduction threshold is 0.7 volts; however, the conduction threshold is not limited to any value disclosed herein. The inherent first parasitic diode 514 may conduct a parasitic current while the first blocking transistor 506 is not conducting. For example, the current conducting through the current terminal 512 (e.g., drain terminal) to the current terminal 510 (e.g., source terminal) is zero amperes when the first blocking transistor 506 is not conducting, and the current conducting through the first parasitic body diode 514 may be one microampere. Other examples disclosed herein include a current conducting through the parasitic body diode 514, while the first blocking transistor 506 is conducting or not conducting, of any numerical ampere value (e.g., one ampere, 5 amperes, 10 amperes). The conduction of current through the first parasitic body diode 514 when the first blocking transistor 506 is not conducting may cause damage to the USB-C device (e.g., the device that includes the dual-port device 500) or the USB-A source (e.g., the device connected to the first USB-C female connector 504).

The second USB-C female connector 516 is coupled to the second blocking transistor 518. The second USB-C female connector 516 is located on a host device (e.g., personal computer, laptop, dock); however, the second USB-C female connector 516 may be located on other devices as well (e.g., peripheral devices). The second USB-C female connector 516 includes full duplex connection capabilities (e.g., ability simultaneously communicate host-to-device or device-to-host). A full duplex connector (e.g., the second USB-C female connector 516) is a connector that allows for the transmission of data in two directions, simultaneously. The full duplex USB-C connector (e.g., the second USB-C female connector 516) enables compatible electronic devices to cross talk, supply power, and/or consume power, simultaneously. Additionally, in some examples disclosed herein, the second USB-C female connector 504 is a universal serial bus type-c power delivery compatible connector that is compatible with universal serial bus type-c power delivery applications.

Additionally, the second USB-C female connector 516 supports the specifications supported by USB-A (e.g., USB 1.0, USB 1.1, USB 2.0, USB 3.0), along with the Universal Serial Bus 3.1 (USB 3.1) and Universal Serial Bus Power Deliver (USB PD) specifications. The second USB-C female connector 516 supports all legacy specifications supported by the USB-A standard.

The example second blocking transistor 518 is an n-channel metal-oxide-semiconductor field-effect transistor (NMOS). In other examples, the second blocking transistor 518 may be an p-channel metal-oxide-semiconductor field-effect transistor (PMOS) or any other switching device. The second blocking transistor 518 includes three current terminals (e.g., gate terminal 520, current terminal 522, and current terminal 524) and a second parasitic body diode 526.

In the example depicted in FIG. 5, the second blocking transistor 518 includes a gate terminal 520 coupled to the controller 530.

The example gate terminal 520 of the second blocking transistor 518 receives an input signal from the example controller 530. The input signal received at the gate terminal 520 of the second blocking transistor 518 may be a pulse width modulation (PWM) signal. The PWM signal is a periodic signal having a frequency with a respective on-time and off time.

The example current terminal 522 (e.g., source terminal) of the second blocking transistor 518 is coupled to the second USB-C female connector 516. The node shared by the current terminal 522 (e.g., source terminal) and the second USB-C female connector 516 is coupled to the controller 530. The current terminal 524 (e.g., drain terminal) of the second blocking transistor 518 is coupled to the example system capacitor 502 and the variable power supply 528.

Additionally, the second blocking transistor 518 includes a second example parasitic body diode 526. The second parasitic body diode 526 is a parasitic diode that conducts current when a voltage drop between the anode (e.g., current terminal 522) and the cathode (e.g., current terminal 524) exceeds a conduction threshold. In some examples, the conduction threshold is 0.7 volts; however, the conduction threshold is not limited to any value disclosed herein. The inherent second parasitic diode 526 may conduct a parasitic current while the second blocking transistor 518 is not conducting. For example, the current conducting through the current terminal 524 (e.g., drain terminal) to the current terminal 522 (e.g., source terminal) is zero amperes when the second blocking transistor 506 is not conducting, and the current conducting through the second parasitic body diode 526 may be one microampere. Other examples disclosed herein include a current conducting through the second parasitic body diode 526, while the second blocking transistor 518 is conducting or not conducting, of any numerical ampere value (e.g., one ampere, 5 amperes, 10 amperes). The conduction of current through the second parasitic body diode 526 when the second blocking transistor 518 is not conducting may cause damage to the USB-C device (e.g., the device that includes the dual-port device 500) or the USB-A source (e.g., the device connected to the second USB-C female connector 516).

The example variable power supply 528 is coupled to the controller 530 and the node that includes the system capacitor 502 and the current terminals 512, 524 of the first and second blocking transistors 506, 518. The example variable power supply 528 is included in the USB-C compatible device (e.g., the device which includes the USB-C female connectors 504, 516). In some examples disclosed herein, the variable power supply 528 may be a power converter (e.g., buck converter, boost converter, buck-boost converter, etc.), a battery, a switched mode power supply, and/or transformer. Additionally, the variable power supply 528 is controlled by the controller 530 through a series of signals and/or commands. Example signals and/or commands may be generated using a digital-to-analog converter (DAC), an array of switches and/or transistors, and/or a control line. In some examples disclosed herein, the variable power supply 528 operates continuously, periodically, aperiodically and/or based on a trigger. In examples disclosed herein, the trigger is generated by the controller 530. Other examples disclosed herein may include a variable power supply 528 utilizing alternating current (AC) (e.g., an alternating current to direct current power converter, alternating current to alternating current power converter, alternating current transformer). Examples disclosed herein include pre-charging the system capacitor 502 to any voltage magnitude that can reverse bias the parasitic component(s) (e.g., the parasitic body diode(s) 514 and/or 526) in the blocking transistor(s) 506 and/or 518. Examples disclosed herein include pre-charging the system capacitor 502 to a voltage potential that ensures the conduction threshold of the parasitic body diode(s) 514 and/or 526 is not satisfied. The system capacitor 502 may be pre-charged by sending a trigger to the variable power supply 528, therefore notifying the variable power supply 528 to supply power to the system capacitor 502. In some examples disclosed herein, power may be supplied through a voltage from the variable power supply 528.

The example controller 530 of FIG. 5 includes the state machine 321 of FIG. 3, the control signal generator 402, and the negotiator 404 of FIG. 4. The example controller 530 is coupled to the variable power supply 528, the blocking transistors 506, 518, and the USB-C female connectors 504, 516. The controller 530 may be implemented by one or more integrated circuits, logic circuits, microprocessors, graphics processing units (GPUs), digital signal processors (DSPs), or controllers from any desired family or manufacturer. Other examples disclosed herein include the controller 530 integrated within the device housing the dual USB-C female connectors 504, 516 (e.g., the processor within a personal computer housing the dual USB-C female connectors 504, 516). Additionally or alternatively, the controller 530 may be implemented externally from the device housing the dual USB-C female connector 504, 516 (e.g., a personal computer housing a USB-C female connector) in one or more integrated circuits, logic circuits, microprocessors, GPUs, DSPs, or controllers from any desired family or manufacturer.

In the example depicted in FIG. 5, the controller 530 sends a turn on and/or off signal to the blocking transistors 506, 518 (lines 532, 534). Additionally, the controller 530 sends a trigger signal (e.g., PWM signal) (line 536) to the variable power supply 528 indicating whether or not to pre-charge the system capacitor 502. In examples disclosed herein, the controller 530 is connected to the USB-C female connectors 504, 516 to obtain reference values indicative of whether or not a device is attached (e.g., connected) or unattached (e.g., not connected) to the USB-C female connectors 504, 516. For example, if no device is connected to the USB-C female connector 504, the reference value may be indicative of no connection (e.g., the reference value may be zero) to the USB-C female connector 504. The controller 530 may be connected to a pin on the USB-C female connectors 504, 516 such as the configuration channel pin; however, any other method of connecting the controller 530 to the USB-C female connectors 504, 516 may be used.

The example state machine 531 is located in the controller 530. The example state machine 531 is any device that obtains and/or stores the status (e.g., state) of the reference value at the USB-C female connectors 504, 516. Furthermore, in response to the state of the reference values obtained from the USB-C female connectors 504, 516, the state machine 531 may generate commands to be sent to the blocking transistors 506, 518 (lines 532, 534) and/or the variable power supply 528 (line 536). Additionally, the state machine 531 may serve as a communication link to the device(s) connected to the USB-C female connectors 504, 516 to negotiate a new contract of operation. Example contracts of operation include indicating which device (e.g., the device housing the USB-C female connectors 504, 516 or the USB-A device connected to the USB-C female connectors 504, 516) is to supply and/or consume power. The state machine 531 may be implemented using hardware such as a logic circuit, software, or any combination of hardware and/or software.

The controller 530 of the illustrated example is hardware. For example, the controller 530 can be implemented by one or more integrated circuits, logic circuits, microprocessors, GPUs, DSPs, or controllers from any desired family or manufacturer. The hardware controller 530 may be a semiconductor based (e.g., silicon based) device. The processor platform can be, for example, a server, a personal computer, a workstation, a dock, a monitor, a self-learning machine (e.g., a neural network), a mobile device (e.g., a cell phone, a smart phone, a tablet), a personal digital assistant (PDA), an Internet appliance, a DVD player, a CD player, a digital video recorder, a Blu-ray player, a gaming console, a personal video recorder, a set top box, a headset or other wearable device, or any other type of computing device.

Figure 6:
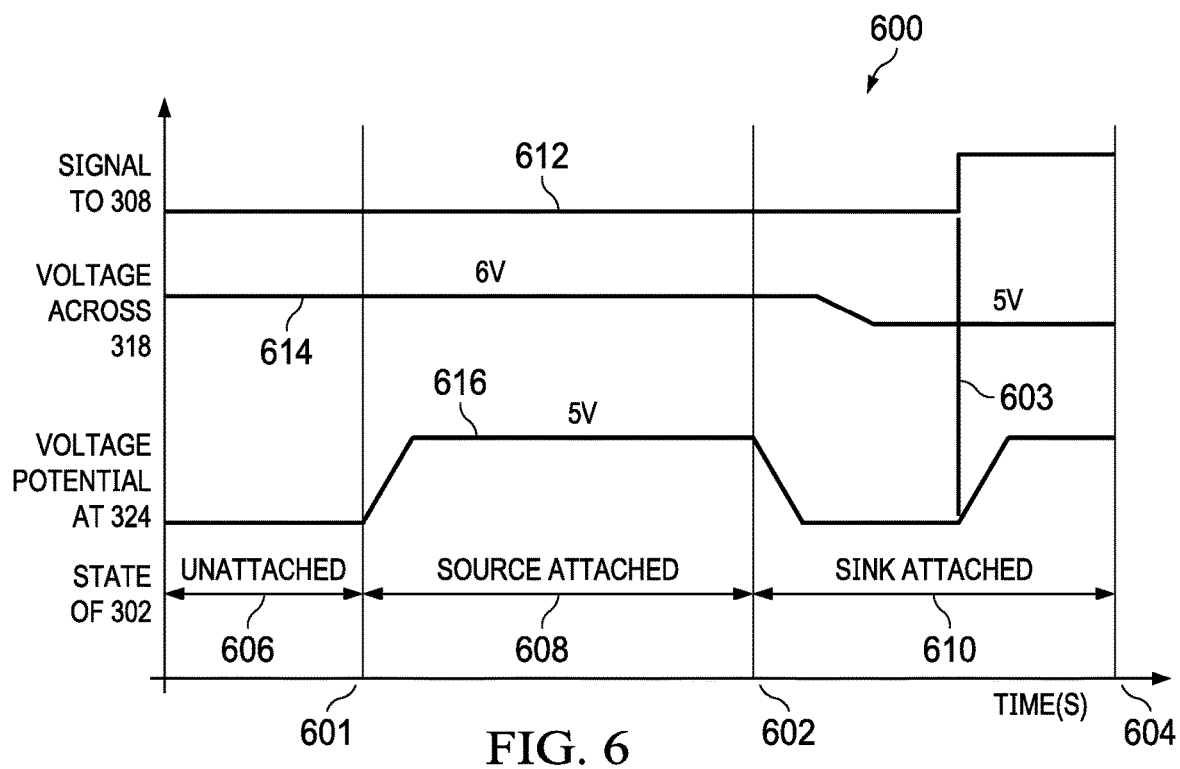
FIG. 6 is a graphical illustration of various signals of the example system of FIG. 3 during operation.

FIG. 6 is a graphical illustration 600 of various signals of the example system of FIG. 3 during operation. The graphical illustration 600 includes a state indication of the USB-C female connector 302 (segments 606, 608, 610), a gate terminal 308 of FIG. 3 signal, line 612, a voltage potential across the system capacitor 318 of FIG. 3, line 614, and a voltage potential at the current terminal (e.g., source terminal) 310 of FIG. 3, line 616.

Initially, the state of the USB-C female connector 302, segment 606, is unattached (e.g., not connected). Line 612 for the gate terminal 308 of the blocking transistor 306 is low (e.g., off), indicating to not conduct. Likewise, the voltage potential across the system capacitor 318, line 614, is pre-charged. Illustrated in FIG. 6, the magnitude of the voltage of line 614 is six volts; however, the magnitude of the voltage of line 614 is not limited to any specific value.

During times 601 and 602, the state of the USB-C female connector 302, segment 608, is attached. Initially, illustrated in FIG. 6, the device attached to the USB-C female connector 302 may act as a source. This causes the voltage potential at the current terminal (e.g., source terminal) 310, line 616, to increase to around 5 volts.

During times 602 and 603, the controller 320 of FIG. 3 negotiates with the device attached (e.g., connected) to the USB-C female connector 302 to indicate to supply power. As a result of this negotiation, the device attached (e.g., connected) to the USB-C female connector 302 acts as a sink. The voltage across the system capacitor 318, line 614, begins to decrease due to the change in contract to supply power. Alternatively, the voltage across the system capacitor 318, line 614, may increase to any numerical voltage magnitude (e.g., five volts, ten volts, twenty volts) to supply power to the device connected to the USB-C female connector 302. During times 603 and 604, the signal to the gate terminal 308 is high (e.g., indicating to turn on the blocking transistor 306), line 612. Likewise, the voltage potential across the system capacitor 318 is equivalent to the voltage potential at the current terminal (e.g., source terminal) 310. The device connected to the USB-C female connector 302 is acting as a sink, segment 610, therefore consuming power.

Figure 7:
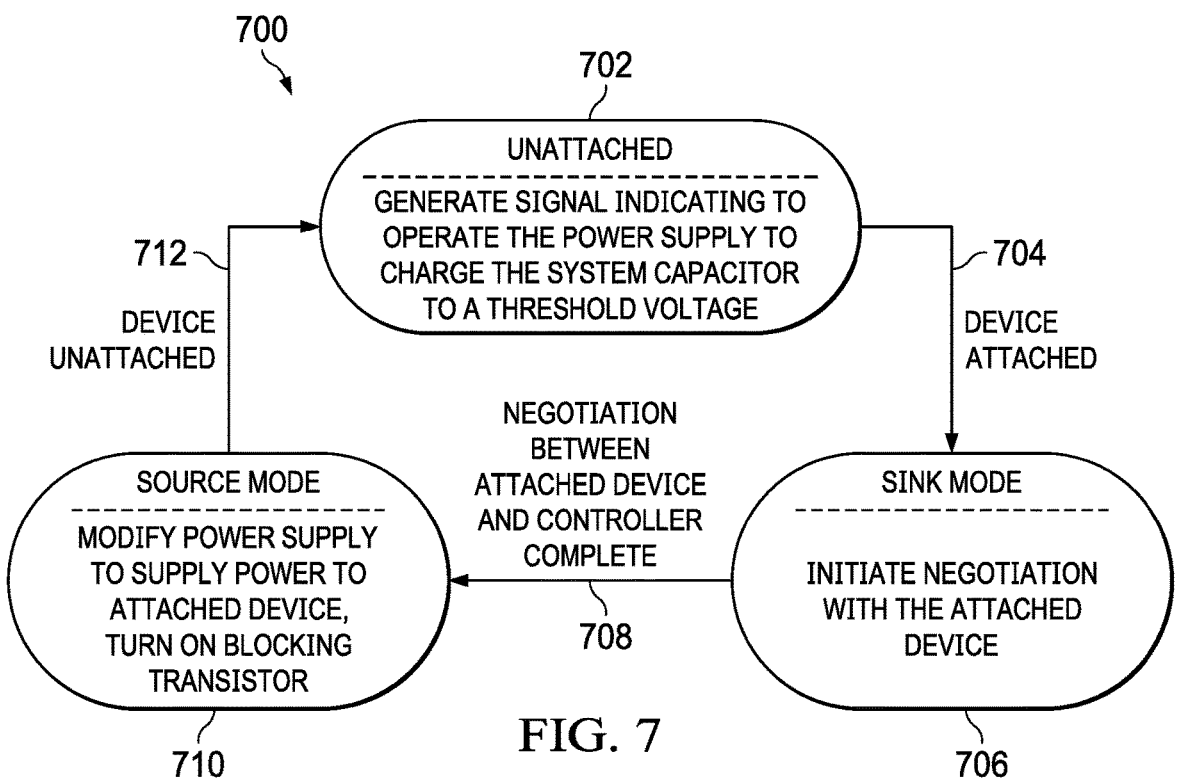
FIG. 7 is a state diagram representative of example operating states in which the controller of FIG. 3, 4, or 5 may operate.

FIG. 7 is a state diagram 700 representative of example operating states in which the controller 320, 530 of FIG. 3, 4, or 5 may operate. When in an example first state 702, the controller 320, 530 of FIG. 3, 4, or 5 is in an example unattached mode (e.g., not connected). In the example first state 702, the controller 320 of FIG. 3, 4, or 5 generates a signal that indicates to operate the power supply (e.g., the power supply 322 of FIG. 3 and/or the variable power supply 528 of FIG. 5) to charge the system capacitor (e.g., the system capacitor 318 of FIG. 3 and/or the system capacitor 502 of FIG. 5) to a threshold voltage. Once a device is attached (e.g., connected) to the USB-C female connector (e.g., the USB-C female connector 302, 504, 516), the first operating condition 704 is satisfied.

In the illustrated example of FIG. 7, in response to a device being attached to the USB-C female connector (e.g., the USB-C female connector 302, 504, 516), the controller (e.g., the controller 320 or the controller 530) enters an example second state 706, a sink mode. In the example second state 706, a negotiator (e.g., the negotiator 404) initiates negotiation with the attached (e.g., connected) device. In examples disclosed herein, the negotiation is initiated to determine when to source power. When the negotiation between the attached (e.g., connected) device and the controller (e.g., the controller 320 or the controller 530) is complete, the example second operating condition 708 is satisfied. Examples in which the negotiation completes includes the determination for the controller to source power to the connected device.

In the illustrated example of FIG. 7, in response to the negotiation between the attached (e.g., connected) device and the controller (e.g., the controller 320 or the controller 530) being complete, the controller (e.g., the controller 320 or the controller 530) enters an example third state 710, a source mode. In the example third state 710, the controller (e.g., the controller 320 or the controller 530) modifies the power supply (e.g., the power supply 322 of FIG. 3 and/or the variable power supply 528 of FIG. 5) to supply power to attached device and turns on blocking transistor (e.g., the blocking transistor 306 of FIG. 3, the first blocking transistor 506 of FIG. 5, or the second blocking transistor 518 of FIG. 5). When the device becomes unattached (e.g., not connected), the example third operating condition 712 is satisfied and the controller (e.g., the controller 320 or the controller 530) enters the example first state 702.

While an example manner of implementing the controller of FIG. 4 is illustrated in FIGS. 3 and 5, one or more of the elements, processes and/or devices illustrated in FIGS. 3 and 5 may be combined, divided, re-arranged, omitted, eliminated and/or implemented in any other way. Further, the example state machine 321, 531, the example control signal generator 402, the example negotiator 404 and/or, more generally, the example controller 320 of FIG. 3 or the controller 530 of FIG. 5 may be implemented by hardware, software, firmware and/or any combination of hardware, software and/or firmware. Thus, for example, any of the example the example state machine 321, 531, the example control signal generator 402, the example negotiator 404 and/or, more generally, the example controller 320, 530 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example state machine 321, 531, the example control signal generator 402, the example negotiator 404 and/or, more generally, the example controller 320 of FIG. 3 or the controller 530 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller of FIGS. 3 and 5 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
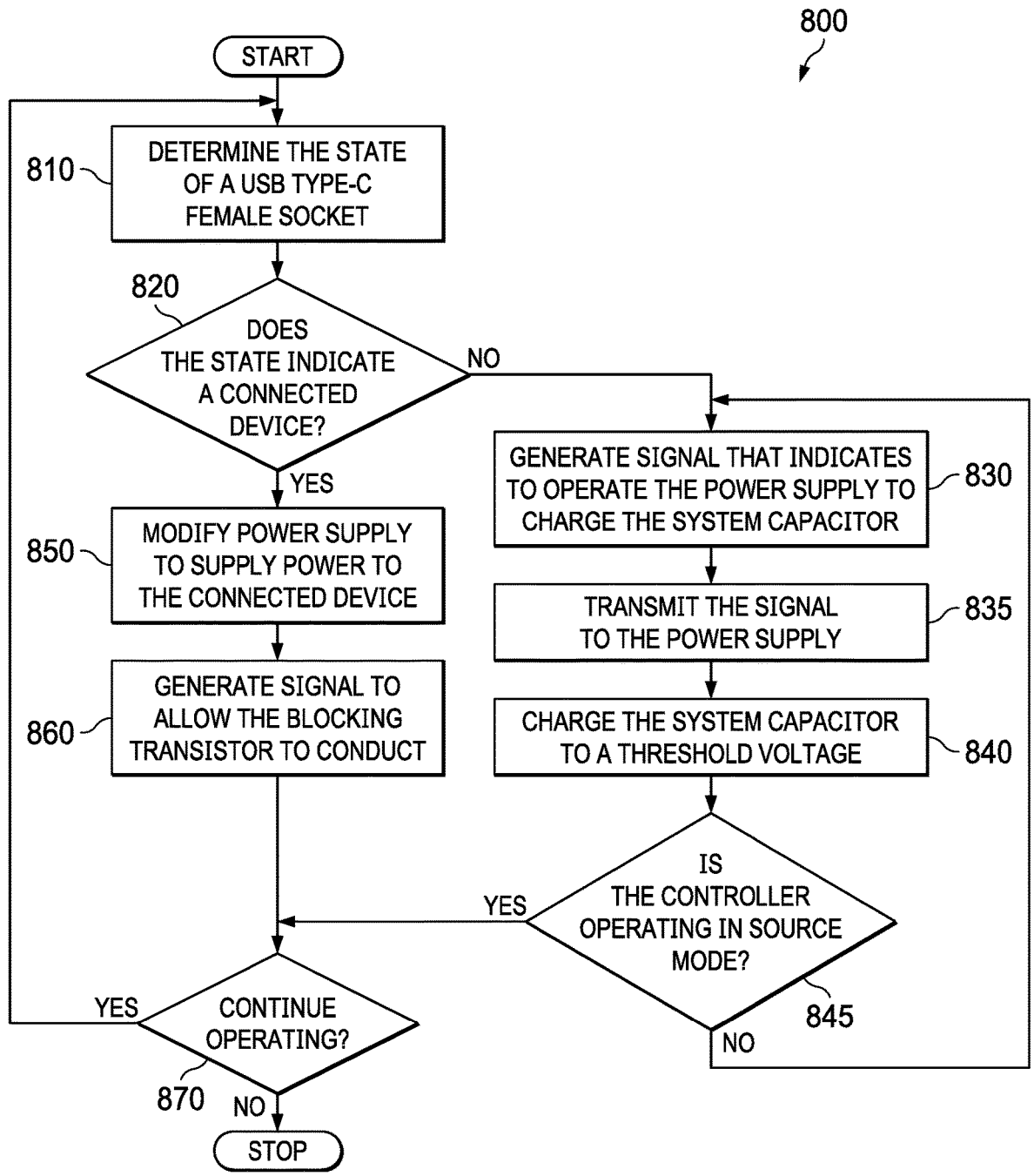
FIG. 8 is a flowchart representative of machine readable instructions that may be executed to implement the controller of FIGS. 3-5.

A flowchart representative of example hardware logic, machine readable instructions, hardware implemented state machines, and/or any combination thereof for implementing the controller of FIGS. 3-5 is shown in FIG. 8. The machine readable instructions may be an executable program or portion of an executable program for execution by a computer processor such as the controller (e.g., the controller 320 or the controller 530) discussed above in connection with FIGS. 3-5. The program may be embodied in software stored on a non-transitory computer readable storage medium such as a CD-ROM, a floppy disk, a hard drive, a DVD, a Blu-ray disk, or a memory associated with the controller (e.g., the controller 320 or the controller 530), but the entire program and/or parts thereof could alternatively be executed by a device other than the controller (e.g., the controller 320 or the controller 530) and/or embodied in firmware or dedicated hardware. Further, although the example program is described with reference to the flowchart illustrated in FIG. 8, many other methods of implementing the example controller 320, 530 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 8 is a flowchart 800 representative of machine readable instructions that may be executed to implement the controller 320, 530 of FIGS. 3-5. Initially, the controller 320 determines the state of from the USB-C female connector 302, 504, or 506 (Block 810). In examples disclosed herein, the controller 320 may obtain a reference value and determine the state of the USB-C female connector 302, 504, or 506 (Block 810). The state machine 321, 531 in the controller 320 analyzes the state of the reference signal to determine if a source device (e.g., USB-A device 304 or a second USB-C compatible device is plugged in, connected to, attached, and/or communicating with the USB-C female connector 302 and/or the device which houses the USB-C female connector 302) is attached. (Block 820).

If the reference value obtained by the state machine 321, 531 indicates a source device is attached (e.g., device is not plugged in, connected to, attached, and/or communicating with the USB-C female connector 302, 504, 516 and/or the device which houses the USB-C female connector 302, 504, 516) and, thus, the controller 320, 530 is operating in sink mode, the control signal generator 402 generates a signal that indicates to operate the power supply 322 and/or the variable power supply 528 to charge the system capacitor 318, 502 (Block 830). In some examples, the state machine 321, 531 may generate the signal to operate the power supply 322 and/or the variable power supply 528 to charge the system capacitor 318, 502. Additionally, the control signal generator 402 transmits the signal to the power supply 322 and/or the variable power supply 528 (Block 835). In response to the control signal generator 402 transmitting the signal to the power supply 322 and/or the variable power supply 528, the power supply 322 and/or the variable power supply 528 charges the system capacitor 318, 502 to a threshold voltage (e.g., a voltage potential that ensures the parasitic body diode(s) 314, 514, 526 is/are reverse biased) (Block 840). The negotiator 404 determines if the controller 320, 530 is operating in source mode (Block 845). In examples disclosed herein, the negotiator 404 determines the controller 320, 530 is operating in source mode in response to a negotiation being complete to a connected device. Additionally or alternatively, the controller 320, 530 may execute the control of block 845 if the system capacitor 318, 502 is charged to a voltage potential that satisfies the threshold and ensures the parasitic body diode(s) 314, 514, 526 is/are reverse biased. If the controller 320, 530 determines the system capacitor 318, 502 is not yet charged to a voltage potential that ensures the parasitic body diode(s) 314, 514, 526 is/are reverse biased, the control signal generator 402 continues to generate a signal to operate the power supply 322 and/or the variable power supply 528 to charge the system capacitor 318, 502 (Block 840). The example processes illustrated above reducing the inrush current experienced by the parasitic body diode(s) 314, 514, or 526.

If the controller 320, 530 determines that the system capacitor 318, 502 is charged to a voltage potential that ensures the parasitic body diode(s) 314, 514, 526 is/are reverse biased, the controller 320, 530 then determines whether or not to continue operating (Block 870). Instance in which the controller 320, 530 is to cease operating include loss of power or manual shut-off. If the controller 320, 530 is to continue operating, the state machine 321, 531 continues to obtain a reference value from the USB-C female connector (Block 810).

If the reference value obtained by the state machine 321, 521 indicates a source device is attached (e.g., a device is plugged in, connected to, attached, and/or communicating with the USB-C female connector 302, 504, 516 and/or the device which houses the USB-C female connector 302, 504, 516) and, thus, the controller 320, 530 is operating in source mode, the state machine 321, 531 indicates to the control signal generator 402 to generate and/or transmit a signal to modify the power supply 322 and/or the variable power supply 528 to supply power to the connected device (Block 850). In examples disclosed herein, control operates the function of block 850 in response to a negotiation between the attached device and the controller 320, 530 being complete. Additionally, the control signal generator 402 generates a signal to allow the blocking transistor 306, 506, 518 to conduct current (Block 860). The controller 320, 530 then determines whether or not to continue operating (Block 870). Instance in which the controller 320, 530 is to cease operating include loss of power or manual shut-off. If the controller 320, 530 is to continue operating, the state machine 321, 531 continues to obtain a reference value from the USB-C female connector (Block 810).

From the foregoing, it will be appreciated that example methods, apparatus and articles of manufacture have been disclosed that reduce parasitic currents that occur in Universal Serial Bus Type-C circuits and systems. The disclosed methods, apparatus and articles of manufacture improve the efficiency of using a computing device by preventing harmful parasitic currents from conducting in a device. Furthermore, the disclosed methods, apparatus and articles of manufacture improve the efficiency of using a computing device by improving the operating efficiency of Universal Serial Bus Type-C compatible devices by reducing exposure to harmful parasitic currents. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device comprising:
    a power supply having a power control input and having a power output;
    a single field effect transistor (FET) having a source, a drain and a gate, the source connected to a main voltage bus, and the drain directly connected to the power output, the FET having a parasitic body diode with an anode directly connected to a protection terminal on a connector, and a cathode directly connected to the power output;
    a system capacitor directly connected between the cathode and a ground terminal; and
    a controller having a gate output, a connector input and a control output, wherein the gate output is directly connected to the gate, the connector input is coupled to a controller terminal on the connector, and the control output is coupled to the power control input, the controller including a state machine having a state machine input connected to the connector input, having a state output coupled to the control output.

2. The device of claim 1 in which the connector is a universal serial bus-C connector.

3. The device of claim 1 in which the connector is a universal serial bus-C female connector.

4. The device of claim 1 in which the main voltage bus is a $V_{bus}$.

5. The device of claim 1 in which the main voltage bus is a $V_{bus\_c}$.

6. The device of claim 1 including a voltage bus capacitor having a first terminal coupled to the main voltage bus and a second terminal coupled to the ground node.

7. The device of claim 1 in which the power supply is a variable power supply.

8. The device of claim 1 in which the state machine has a sink state to control initiating negotiation with a device attached to the connector.

9. The device of claim 1 in which the state machine has a source mode state to control modifying the power supply to supply power to a device attached to the connector and to turn on the transistor.

10. The device of claim 1 in which the system capacitor is charged to a threshold voltage of five volts.

11. The device of claim 1, in which the state machine includes a state wherein the state machine initiates pre-charging the system capacitor to a threshold voltage from the power output.

12. A process comprising:
    determining whether a connector is connected to a device;
        responsive to determining the connector is connected to the device, negotiating a contract with the connected device to have the connected device act as a sink device;
    responsive to determining the connector is connected to the device, supplying power to the device by turning on a single field effect transistor (FET) to conduct power from a power supply to the connected device, the FET having a gate, a source and a drain, the source connected to a main voltage bus and the drain directly connected to the power supply, the power supply reverse biasing a parasitic diode of the FET, the parasitic diode having an anode directly connected to a protection terminal on the connector, and a cathode directly connected to the power supply; and
    responsive to the connector not being connected to the device, pre-charging a system capacitor to a threshold voltage to reverse bias the parasitic body diode of the FET to ensure the parasitic diode remains reverse biased when the device is connected to the connector and attempts to supply forward biasing voltage to the parasitic diode.

13. The process of claim 12 in which the determining, supplying, and pre-charging include stepping though states of a state machine.

14. The process of claim 12 in which the pre-charging includes pre-charging the system capacitor from the power supply.

15. The process of claim 12 including stepping through states of a state machine, the states including a state of supplying power and a state of pre-charging a system capacitor.

16. The process of claim 12 including stepping through states of a state machine, the states including a state of negotiation with the attached device.

17. The process of claim 12 including after pre-charging the system capacitor to the threshold voltage, determining that the connector is connected to the device, and supplying power to the device by turning on the FET.

18. The process of claim 12 in which the pre-charging includes pre-charging the system capacitor to a threshold voltage of five volts.

19. The process of claim 12 including determining whether a universal serial bus type-C female connector is connected to the device.

* * * * *